Dec. 13, 1966 W. KOBER 3,292,023
DYNAMOELECTRIC MACHINE
Filed Sept. 3, 1964 4 Sheets-Sheet 1
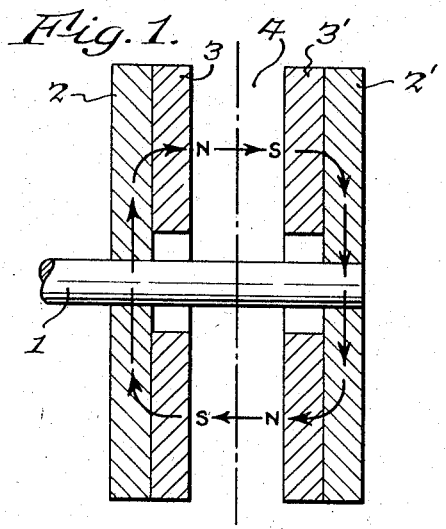
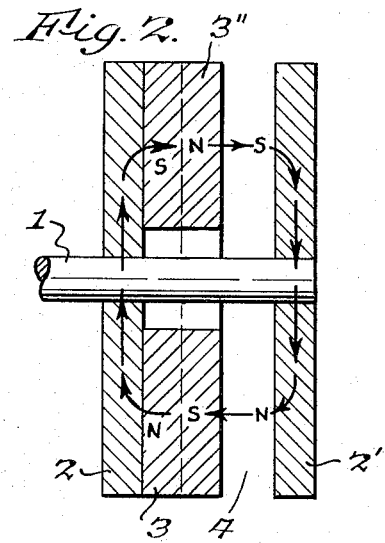
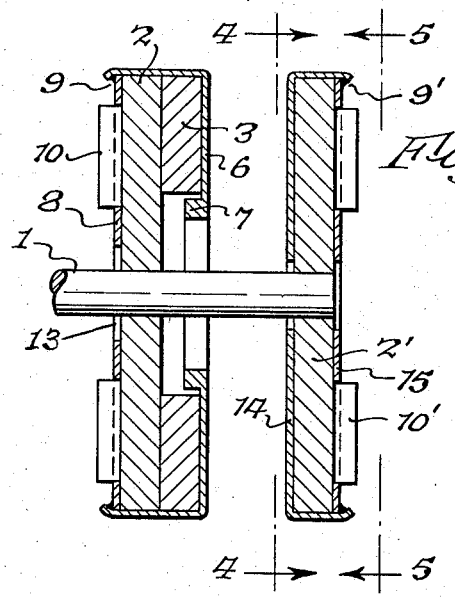
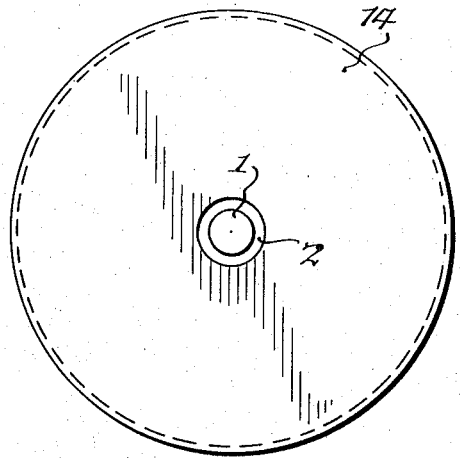
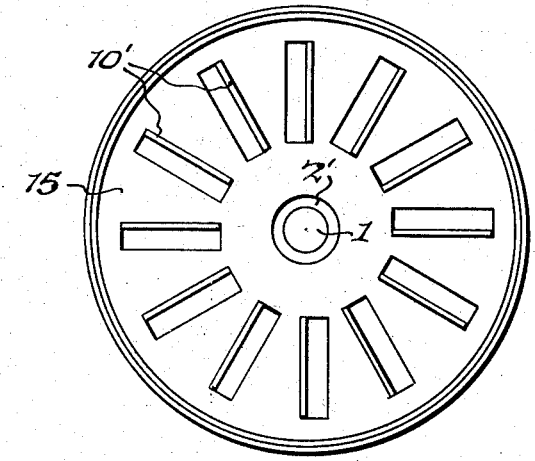
INVENTOR.
William Kober
BY
Christel & Bean
ATTORNEYS.

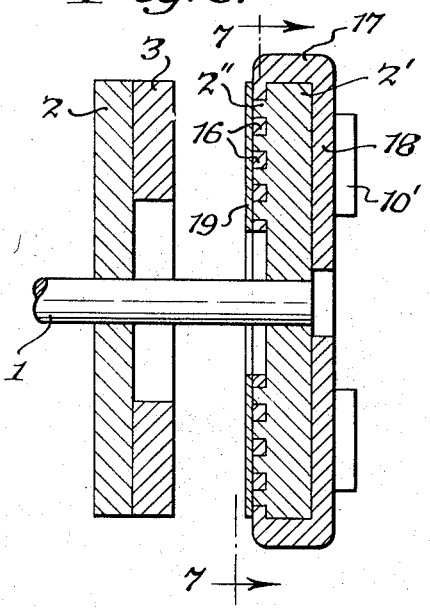
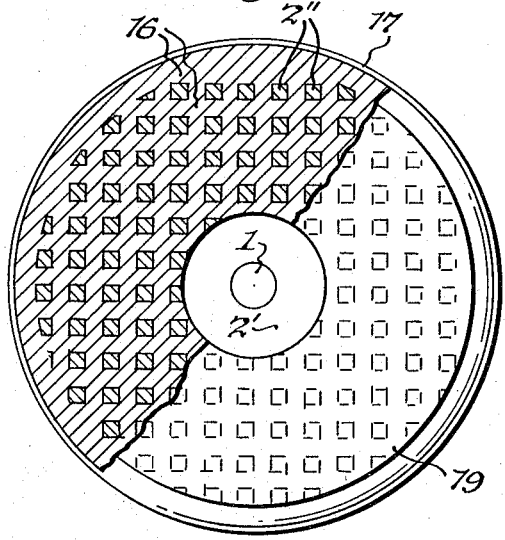
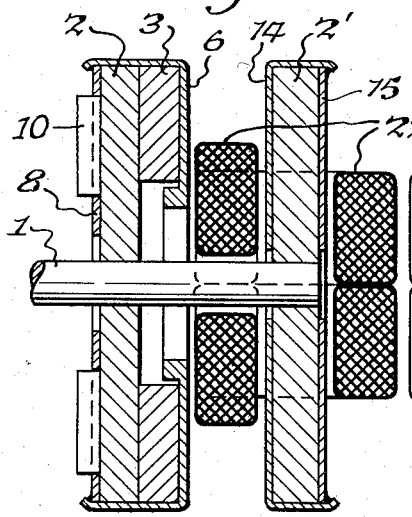
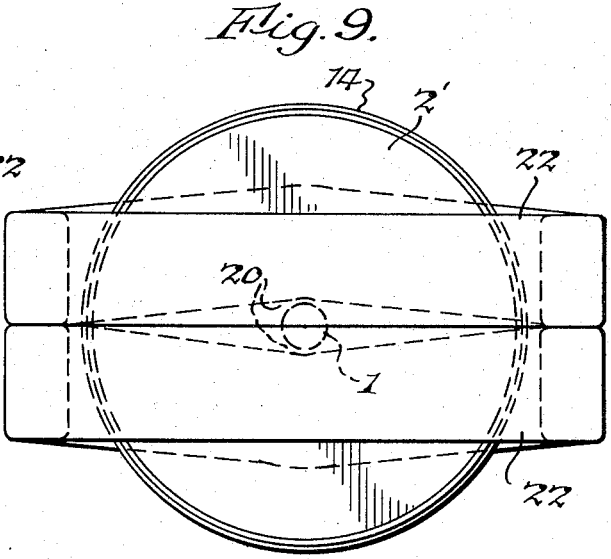

Dec. 13, 1966 W. KOBER 3,292,023
DYNAMOELECTRIC MACHINE
Filed Sept. 3, 1964 4 Sheets-Sheet 3
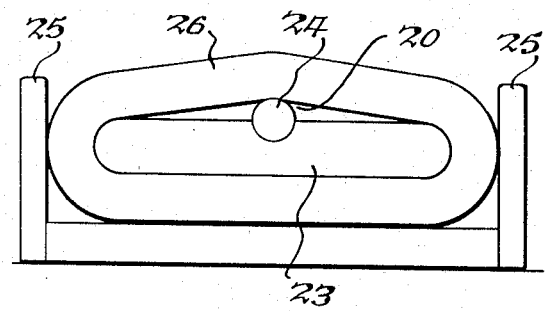
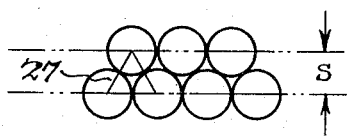
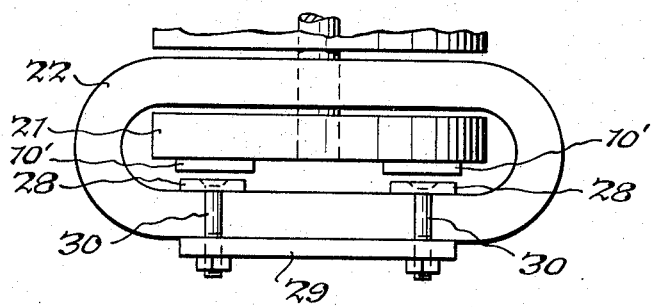
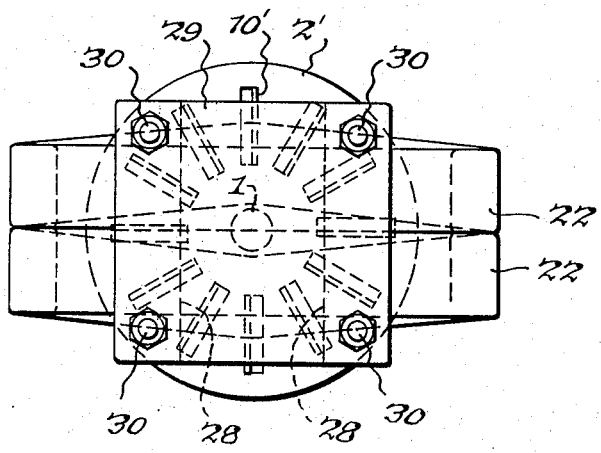
INVENTOR.
William Kober
BY
Christel & Bean
ATTORNEYS.

United States Patent Office 3,292,023
Patented Dec. 13, 1966

3,292,023
DYNAMOELECTRIC MACHINE
William Kober, Fairport, N.Y., assignor, by mesne assignments, to The Garrett Corporation, Los Angeles, Calif., a corporation of California
Filed Sept. 3, 1964, Ser. No. 394,242
16 Claims. (Cl. 310—156)

This invention relates generally to the dynamoelectric art, and more specifically to new and useful field and armature arrangements for axial air gap machines utilizing permanent magnets. This application is in part a continuation of my pending application Serial No. 238,249, filed November 16, 1962 as a continuation-in-part of my earlier application Serial No. 770,029, filed October 28, 1958 and now abandoned.

An object of this invention is to provide a simplified structure of the type made by using two magnetic surfaces, facing each other in N–S relation across an air gap without sacrificing efficiency. Another object of this invention is to provide a simplified armature winding into which such a magnet system works. Still another object of my invention is to provide damping and cooling for such a simplified structure.

In one aspect thereof, a dynamoelectric machine constructed in accordance with my invention is characterized by the provision of first and second field structures mounted for rotation about an axis and spaced apart in the direction of said axis to provide an axial air gap therebetween, the first field structure having flux producing means magnetized in the direction of the axis, the second field structure providing substantially only a flux return for the first field structure, and an armature having a portion positioned in the flux path between the field structures.

In another aspect thereof, a dynamoelectric machine constructed in accordance with this invention is characterized by the provision of opposed field structures mounted for rotation about an axis, the structures being spaced apart in the direction of the axis to provide an axial air gap and one of the field structures including flux producing means magnetized in the direction of the axis, an armature winding including a coil wound around one of the field structures and having a portion disposed in the air gap, the field structures being generally cylindrical and the armature coil being curved in general conformance to the circumferential curvature of the field structure about which it is wound.

In another aspect thereof a dynamoelectric machine constructed in accordance with my invention is characterized by the provision of first and second field structures, shaft means mounting the field structures for rotation about an axis, the field structures being spaced apart in opposed relation lengthwise of the axis to provide an axial air gap therebetween, one of the field structures including flux producing means magnetized in the direction of the axis, and an armature coil wound around one of the field structures, the coil having a portion positioned in the air gap adjacent the radial center thereof, the coil portion being radially displaced to accommodate the shaft means.

In still another aspect thereof, there is provided by my invention a polyphase dynamoelectric machine characterized by the provision of opposed field structures mounted for rotation about an axis, the field structures being spaced apart in the direction of the axis and one of the field structures having magnetic flux producing means, an armature comprising a coil for each phase, each coil being wound around one of the field structures, and one of the coils fitting within another thereof in angularly, phase displaced relation thereto.

In yet another aspect thereof, a dynamoelectric machine constructed in accordance with my invention is characterized by the provision of opposed field structures mounted for rotation about an axis, the structures being spaced apart in the direction of the axis to provide an axial air gap therebetween, one of the structures including flux producing means permanently magnetized in the direction of the axis, the other field structure being magnetically passive and comprising a magnetic member providing substantially only a flux return circuit, a casing of highly electrically conductive nonmagnetic material having an outer side wall encircling the outer peripheral side of the magnetic member and an end wall extending inwardly along the air gap end face of the magnetic member, and an armature winding having a portion disposed in the air gap.

The foregoing and other objects, advantages and characterizing features of a dynamoelectric machine constructed in accordance with my invention will become clearly apparent from the ensuing detailed description of certain illustrative embodiments thereof, reference being made to the accompanying drawings wherein like reference numerals denote like parts throughout the various views and wherein:

FIG. 1 is a longitudinal sectional view through a dynamoelectric machine showing an opposed field arrangement, the armature being removed for clarity and ease of illustration;

FIG. 2 is a corresponding view, but showing the simplified structure of this invention;

FIG. 3 is a similar view of a simplified structure according to this invention, with damping and cooling means added thereto;

FIG. 4 is an end elevational view taken about on line 4—4 of FIG. 3;

FIG. 5 is an opposite end elevational view taken about on line 5—5 of FIG. 3;

FIG. 6 is a view similar to that of FIG. 3 but showing a modified construction;

FIG. 7 is a view, partly in section and partly in end elevation, taken about on line 7—7 of FIG. 6;

FIG. 8 is a view similar to that of FIG. 3 but with an armature arrangement of this invention in place therein;

FIG. 9 is an end elevational view of the armature and passive field structure of FIG. 8;

FIGS. 10 and 11 are generally schematic views illustrating the forming of the armature winding used in FIGS. 8 and 9;

FIGS. 12 and 13 are top plan and end elevational views, respectively, showing a mounting arrangement for the armature of FIGS. 8 and 9;

Figure 14:
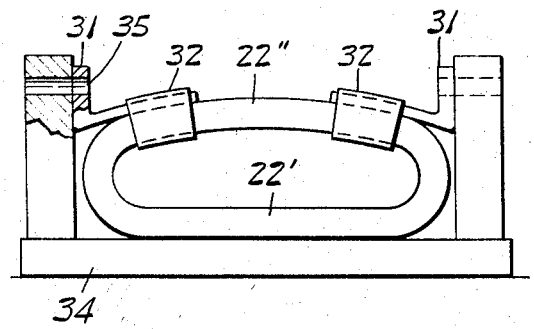
FIGS. 14, 15 and 16 are generally schematic, plan views of armature windings of this invention with various mounting brackets thereon, FIG. 14 showing the armature coil and its mounting brackets in a fixture, for drilling of the mounting holes in the brackets.

FIG. 1 shows, for purposes of comparison, an axially opposed active field system. Shaft 1 is journaled by means not shown, for rotation about its lengthwise axis and carries two magnetic iron discs 2 and 2' in axially spaced relation. To each disc 2, 2' there is fastened, by means not shown, a disc shaped magnet or magnet set 3 and 3', respectively, which may be of metal alloy or of a ceramic composition such as barium ferrite. Magnets 3 and 3' are permanently magnetized so that the facing parts have a series of axially directed, alternating poles, arranged with a N pole on 3 facing a S pole on 3', and vice versa, although this need not necessarily be the case. The arrows in FIG. 1 show the magnetic circuit for a 2 pole magnet system.

Discs 2 and 2' serve both a mechanical function, acting as a support for the field magnets, and a magnetic function, acting as a return circuit for the flux from the rear faces of the magnets 3 and 3'. It is an important property of this system that the field flux in the iron discs is steady, not alternating, whereby no losses due to hysteresis and eddy currents are present, and the density of flux can be planned according to the maximum capacity of the iron without restrictions because of such loss factors.

FIG. 2 shows a corresponding structure modified in accordance with one aspect of my invention in its simplest form. The field arrangement is similar to that of FIG. 1, but field magnet 3' has been omitted. Only field structure 2, 3 is flux generating, the structure 2' being only a flux return. Accordingly, I denote field structure 2, 3 as being magnetically active, and field structure 2' as magnetically passive. The flow of flux is axial, similar to that of FIG. 1, not radial, and it will be appreciated that the relation of the air path length and the length of the magnet will still follow normal magnetic loading design rules.

The advantages of this simplified field structure are numerous. The requisite supports for magnets 3 and 3' (FIG. 1), when designed with proper attention to safety, reliability and performance, show a considerable degree of complexity. In the system of FIG. 2, these supports are reduced by half. Another important consideration is that the number of magnet pieces also is reduced by half. The cost of making magnets is dependent not only on total weight, but on the number of pieces, whereby fewer magnets on the same total weight will be markedly less expensive.

FIG. 2 shows magnet 3 attached to iron disc 2, but the magnet could instead be attached to disc 2', omitting magnet 3 and leaving disc 2 facing magnet 3' across the air gap 4.

The losses incurred in changing from FIG. 1 to FIG. 2 are minor, but an understanding of them will help in understanding the invention. The simplest way to make the transition from FIG. 1 to FIG. 2 is to shift magnet 3' across air gap 4, and combine magnets 3 and 3' of FIG. 1 into one magnet which is the magnet 3" of FIG. 2. When the span of a pole is much larger than the separation between discs 2 and 2', as is usually the case, it is seen that the same total magnet length and air gap length continue to hold in FIG. 2 as well as FIG. 1. Some minor losses in interpole and edge leakages will be noted in the FIG. 2 form.

Another way of looking at the transition from the system of FIG. 1 to one like that of FIG. 2 is to consider them identical up to center line 5. Line 5 is in an equipotential magnetic region, by symmetry. Now remove magnet 3' and move disc 2' until its air gap face touches the center line 5. The flux in the air gap to the left of line 5 will be very nearly identical with that in the air gap 4 of FIG. 2. Thus, the FIG. 2 version produces a generator having half the capacity of FIG. 1, and is a convenient way of making a generator of half the capacity using mostly parts of the original FIG. 1 unit.

In the above, the effect only of field M.M.F. has been described in comparing the structures of FIGS. 1 and 2. The effect on armature reaction must also be evaluated. This analysis however, is similar to that for the field. The armature coil has its reactance principally determined by the distance from iron disc 1 to iron disc 2, since high performance magnets have permeabilities that are not much more than that of air. Thus, the reactance of the armature is changed only slightly, the result of moving it from midway between equipotential surfaces of 2 and 2' to a point near 2'.

Permanent magnet generators usually need protection against the demagnetizing effects of short circuit and armature reaction. A damper also is desirable for efficient performance. One way of providing this in the structure of my invention is shown in FIG. 3, where the magnet 3 is encased in a shell made of copper, aluminum or other good nonmagnetic electrical conductor. In a simple form, this shell casing is made up of a cup-shaped part 6, providing an outer side wall and an air gap end wall with a hole in the center to pass the shaft 1. Particularly in 2 or 4 pole machines, the damping circuit should be supplemented by increasing its section at 7 which can either be formed into part 6 or conductively attached to it by brazing, welding or soldering. Also, particularly in 2 or 4 pole machines, the damping circuit should have its section and conductivity supplemented by a back plate 8 of material similar to that of 6. If the rim of cup 6 overlaps plate 8, it may be formed over at 9 and the joint soldered, welded or brazed.

To produce cooling in the entire generator, particularly of the magnet air gap face at 6, which is very close to and has a large area facing the stator windings where most of the heat is generated, plate 8 may have fan blades 10 raised in it, punched into it, or conductively attached to it. Fan blades 10 are substantially radial, but may be curved for mechanical stiffness and strength and for improved aerodynamic action.

In considering this cooling action, it should be remembered that in a single phase generator, a considerable amount of heat is developed directly in the damper material of 6, 7 and 8. The backplate 8 will add considerably to the effective conductivity of the damper circuit, and it does this without increase of thickness at the face 6, which of course reduces the effective space for the armature winding.

Since a good conductor of electricity is a good conductor of heat, and the sections required for damping are large, a very excellent cooling action is provided by this use of the damper. The joint between 6 and 8, which is highly conductive for electrical current, is also highly conductive of the heat. Fan blades 10, formed from the material of plate 8, or brazed or welded to it, are themselves in the heat conducting circuit, and blades 10 supply direct cooling to the air being fanned on their surfaces, as well as indirect cooling by air movement over the stator and the generator in general.

In 4 pole machines, the current flow will be in a 4 pole pattern which will be obvious to those skilled in the art. The plate 8 will still provide a very considerable supplement to the conductivity of the damper circuit. For a larger number of poles, less and less of the damper current path penetrates beyond the rim or side wall of part 6. However, the cooling action of plate 8 and its fan continues. For such applications, it is best to make the hole 13 in plate 8 much larger, and make the fan blades 10 shorter radially and nearer the rim of plate 8. This will continue the cooling action with a minimum of material keeping that which is most effective for the remaining electrically conductive function of plate 8.

It is a feature of this invention that a damper and cooling system is provided for the inactive field 2' of FIG. 2, one form of which is shown in FIG. 3. The passive field structure 2' of FIG. 2 does not require a damper, if the damper 6, 7, 8, 9 on the active field structure 2 is sufficiently large. However, the ease of placing a damper on iron disc 2', to which it may be furnace soldered or brazed, is such that it normally will be preferred to put part if not all of the damping action on the inactive or passive field structure 2'. The damper is a cup-like shell or casing 14 having an air gap end wall and an encircling outer side wall, as shown. An end wall 15 is joined to the cup side wall at its edge, as shown, the parts 14, 15 being made of highly electrically conductive material such as aluminum or copper. The added separation between the disc surface and the armature winding (not shown) also produces a minor advantage in performance, in that it reduces the magnetic loading on the iron. The damper 14, 15, being of heat as well as electrically conductive material, also is useful in its cooling action. However, disc 2', being of iron and not very thick, will itself conduct heat relatively well to the back face, where fan blades 10' may be attached heat conductively, or produced from the material of end wall 15 to accomplish cooling.

The ease of placing the damper-slugging structure on iron disc 2' provides another form of invention, in which there is only the damper 14, 15 on 2', and none on the active field 2, 3. This form is useful in low speed machines, where the problem of supporting magnet 3 and protecting it from splitting, chipping and spalling due to centrifugal force is not serious.

The air gap end wall of cup 14 functions in the manner of a damper winding, and coacts with the outer side wall to provide short circuited turns protecting the magnetic state of magnet 3.

Another method of securing damping, which may also be combined with cooling by fan blades heat conductively attached to or formed from the damper material is shown in FIGS. 6 and 7. The advantage of this grid damper is that it does not add to the length of the effective magnetic air gap 4. In this form, the magnetic material of disc 2' is formed as a grid of axially directed protuberances 2" on the air gap face. A mating grid of electrically conductive damper material 16 intermeshes with magnetic grid 2", whereby they lie in a common radial plane. The damper material is extended around the periphery of disc 2', as indicated at 17.

A grid damper can be provided behind magnet 3, in lieu of face sheet 6. The teeth of the grid damper can be covered by a thin sheet 19 of magnetic material which acts as a collector of flux and distributes this flux uniformly to and from the disc teeth 2". The teeth 2" are exposed to a considerable air gap, and cover plate 19 is not as necessary on disc 2' as it would be behind magnet 3. However, it still helps to decrease the effective air gap somewhat.

The grid damper is used only on the side of disc 2' facing the magnets, since space around the back is not at a premium. Here, solid metal 18 is used to complete the damper circuit, and fans 10' can be formed from it. The grid damper 16 is most conveniently cast into the iron disc, and aluminum alloy or pure aluminum so cast is preferred, since the grid damper does not increase the effective air gap, and aluminum is lighter per unit of conductivity than copper.

A new shape of stator particularly adapted to two pole generators may be usefully combined with either field structure. In FIG. 8, a rotor arrangement similar to that of FIG. 3 is shown, except that fan blades 10' are omitted. An armature coil 22 is formed which loops around the damped iron disc 2'. In other words, coil 22 is wound in a plane containing the axis of shaft 1, or a plane parallel thereto, as distinguished from a coil wound in a plane normal to the axis of shaft 1. Coil 22 detours shaft 1, as shown at 20, to supply the clearance for the shaft while utilizing the space nearest the center line where the coil includes the most flux. The axial direction of magnetization concentrates the flux in the air gap area.

Coil 22 may be wound in one piece, or in two halves which can be installed by looping over field structure 2 or 2' from opposite sides.

A preferred way of winding the coil is shown in FIG. 10. The coil is formed of round wire of appropriate diameter for the voltage and turns required, and is wound on a form consisting of a block 23 and a spacer 24 which is positioned in an appropriate groove in the block 23. The detour produced by spacer 24 is such as to give the proper clearance 20 for the shaft, as will appear. After the coil is wound, spacer 24 is removed and the outer parts of the coil are held in place by end pieces 25. The top of the coil 26 is then pressed downward and forward with a part (not shown) lined with rubber or other soft material so as not to damage the wire. The detoured part will then rock forward as the coil goes flat on the top surface of form 23, transferring the upward displacement 20 to the lateral, radial displacement desired for accommodating shaft 1.

When using round wire with a diameter $d$, which is preferred to rectangular or square wire because of availability, and price, the space ordinarily taken up is $d^2$, while the useful copper+insulation is $\pi/4d^2$. Also, the wire so piled up is unstable, and does not cement or pot into a good mechanical unit. If the wire is so applied that all layers are wound left to right, for example, with a return at the end of each layer to the original starting point, the wires of the second layer will fall in the groove between wires in the first layer, and so on. FIG. 11 shows wires in such a multilayered winding. For any three wires, the triangle 27 joining the centers is an equilateral triangle. The distance $S$ between layers, instead of being $d$, the wire diameter, is $S=\sqrt{3}/2d$. With numerous layers, an amount of wire can be wound into a given space by $2/\sqrt{3}=1.155$ more than in simple layering. The wire is also quite stable, as each internally located strand is contacted by six surrounding wires. Cement bonding has a better result as well. The wire is so stable that some pressure may be brought to bear on the layers, forming the wires at least part of the way to mating hexagons, still further increasing the space efficiency toward a figure of $4/\pi=1.273$.

Figure 17:
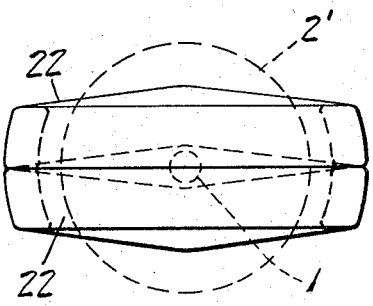
FIG. 17 is a view similar to that of FIG. 9, but on a reduced scale, showing a curved form of the armature windings.

A number of ways of mounting the armature coils are available. FIGS. 12, 13 show one form where coils 22 are mounted between sheet 29 and bars 28 which latter are held at the corners of sheet 29 by screws 30. Since there is no rotor field at the back of 2' where the coil mounting is, the plates 28, 29 may be made of metal, but should be non-magnetic as there is a magnetic field present caused by armature current in the coil. The same current may also induce some eddy current losses in the metal, particularly of bars 28, so that in larger sizes it is preferred to make members 28, 29 also of a non-conductor of electricity.

Where maximum performance at minimum weight is desired, it is advisable to curve the sides of coil 22 to follow the contour of the disc 2', as shown in FIG. 17. When this form is used, it is preferred to wind the wire starting at the top or smaller diameter for each layer.

In FIG. 13, by allowing sufficient room in the width of coil 22, the fan blades 10' may be retained. The air circulated will be inside the winding, and therefore effective for cooling at the major source of heat.

Figure 15:
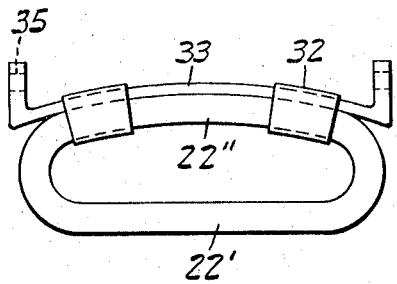
Figure 16:
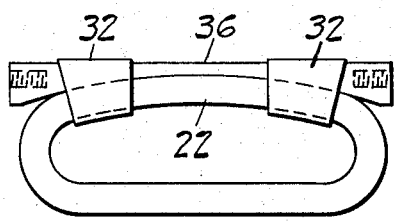

FIGS. 14, 15 and 16 show other coil mounting arrangements. In FIG. 14, a pair of non-magnetic metal brackets 31, preferably formed of aluminum, are cemented on the coil. A non-magnetic wrapping 32 is used to further secure brackets 31 in place. In FIG. 15, the brackets are combined in one piece, as shown at 33.

The assembled coil and brackets 31, 33 can be placed in a fixture 34 and a drill jig (not shown) set up to accurately position the mounting holes 35 the right distance from the air gap portion 22' of the coil. The coils thus can be mounted on the dynamo housing or any desired supporting structure.

In FIG. 16, a plastic mounting block 36 is used in place of bracket 33. Brackets 31 also can be replaced by plastic blocks.

In FIGS. 14–16 the return portion of the coil is bowed, as shown at 22", to allow room for an end washer and nut, or whatever fastening is used to hold the encircled rotor on the shaft.

Thus, there is provided an armature winding particularly useful for 2 pole machines, although its utility is by no means limited thereto. This winding requires only a small additional space beyond the rotor diameter, whereas the usual radial winding projects substantially further. The generator diameter is thereby reduced, with but a small increase in length. It is easier to wind, particularly with round wire, and easier to mount. There is a saving in length of mean turns, with resulting savings in the weight of copper and in resistance to winding. Also, cooling of such coils is excellent, being aided by the fan blades 10 or 10'.

Figure 18:
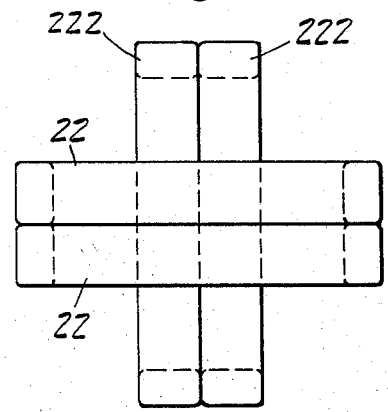
FIGS. 18 and 19 are end and side elevational views, respectively, of a two phase winding arrangement of this invention.
Figure 19:
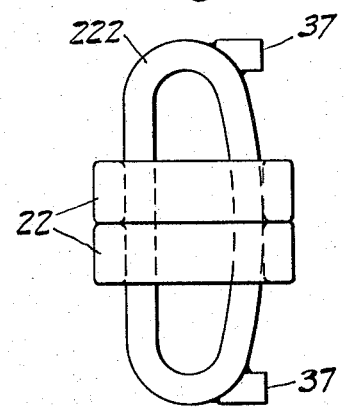

FIGS. 18 and 19 show a two phase armature winding constructed in this manner. One coil set 222 is positioned within and at right angles to the other coil set 22. Each coil of each set is formed as previously described, and each has one or more mounting brackets as indicated at 37. The central bowing at the return portion 22" of coils 22 must be deep enough to pass the mounting brackets 37 of the inside coils 222.

For a three phase winding, a third set of coils (not shown) would be provided, and each set would be positioned at 60° (or 120°) to the others. The coils of the third set could be like coils 22 and 222, and could be positioned outside of coils 22 in FIGS. 18, 19.

Thus, it is seen that my invention fully accomplishes its intended objects. While I have disclosed and described certain embodiments of my invention in considerable detail, it will be appreciated that this has been done by way of illustration only, not by way of limitation.

Also, it will be understood that the designation field structure is used in a broad sense to include the flux producting, return circuit structure 2', as well as the flux producing structures.

Having fully disclosed and completely described my invention, and its mode of operation, what I claim as new is:

1. A dynamoelectric machine comprising opposed field structures mounted for rotation about an axis, said field structures being spaced apart in the direction of said axis to provide an axial air gap therebetween, one of said field structures including flux producing means permanently magnetized in the direction of said axis, the other of said field structures being magnetically passive and comprising a magnetic member providing substantially only a flux return circuit, a casing of highly electrically conductive nonmagnetic material having an outer side wall encircling the outer peripheral side of said magnetic member and an end wall extending inwardly along the air gap end face of said magnetic member, and an armature winding having a portion disposed in said air gap.

2. A dynamoelectric machine as set forth in claim 1, wherein said casing end wall and said magnetic member end face comprise intermeshing grids.

3. A dynamoelectric machine as set forth in claim 1, wherein said casing includes an opposite end wall of highly electrically conductive material extending inwardly along the opposite face of said magnetic member.

4. A dynamoelectric machine as set forth in claim 3, together with fan blades formed from the material of said opposite end wall.

5. A dynamoelectric machine as set forth in claim 3, together with fan blades of heat conductive material carried by said opposite end wall, said armature coil encircling said magnetic member.

6. A dynamoelectric machine as set forth in claim 2, together with a flux collecting sheet of magnetic material overlying said grids.

7. A dynamoelectric machine comprising a magnetic flux producing first field structure mounted for rotation about an axis, and a magnetic second field structure also mounted for rotation about said axis and spaced apart from said first field structure in the direction of said axis to provide an axial air gap between said field structures, said first field structure being magnetized in the direction of said axis, said second field structure providing substantially only a flux return circuit for said first field structure, and an armature winding having portions positioned in the flux path between said field structures, wherein said armature winding comprises coils each wound around one of said field structures.

8. A dynamoelectric machine as in claim 7, wherein said first field structure comprises an annular body of permanent magnet material, and a flux return member magnetically connected to the face of said body opposite the air gap face thereof.

9. A dynamoelectric machine as set forth in claim 7, wherein said first field structure comprises a magnetic flux return member, and permanent magnet means carried thereby, said magnet means being magnetized to provide alternating poles around said axis.

10. A dynamoelectric machine as set forth in claim 7, wherein each of said coils comprises front and rear portions extending through said air gap and behind one of said field structures, and opposite end portions extending around said opposite sides of said one field structure, said opposite end portions being curved in the direction of curvature of said one field structure.

11. A dynamoelectric machine comprising opposed field structures mounted for rotation about an axis, said field structures being spaced apart in the direction of said axis to provide an axial air gap therebetween, one of said field structures including flux producing means permanently magnetized in the direction of said axis, the other of said field structures being magnetically passive and providing substantially only a return circuit for magnetic flux, and an armature winding comprising a coil wound around one of said field structures with a portion of said coil positioned in the flux path between said structures.

12. A dynamoelectric machine comprising opposed field structures mounted for rotation about an axis, said field structures being spaced apart in the direction of said axis to provide an axial air gap, one of said field structures including flux producing means magnetized in the direction of said axis, and an armature winding comprising a coil wound around one of said field structures and having a portion disposed in said air gap, said field structures being generally cylindrical, and said armature coil being curved in general conformance to the circumferential curvature of the field structure about which it is wound.

13. A dynamoelectric machine comprising first and second field structures, shaft means mounting said field structures for rotation about an axis, said field structures being spaced apart in opposed relation lengthwise of said axis to provide an axial air gap therebetween, one of said field structures including flux producing means magnetized in the direction of said axis, and an armature coil would around one of said structures, said coil having a portion positioned in said air gap adjacent the radial center thereof, said coil portion being radially displaced to accommodate said shaft means.

14. A dynamoelectric machine comprising opposed field structures mounted for rotation about an axis, said field structures being spaced apart in the direction of said axis to provide an axial air gap therebetween and one of said field structures being magnetized and flux producing in the direction of said axis, an armature comprising a coil wound about one of said field structures and having a portion positioned in said air gap and another portion disposed on the side of said one field structure last referred to opposite said air gap, and a mounting bracket carried by said other portion of said coil.

15. A dynamoelectric machine comprising opposed field structures mounted for rotation about an axis, said field structures being spaced apart in the direction of said axis to provide an axial air gap therebetween, one of said field structures including means magnetized and producing flux in the direction of said axis, an armature coil wound around one of said field structures, said coil having one portion disposed in said air gap and another portion disposed on the side of said last-named one field structure remote from said air gap, and mounting means for said armature coil including a pair of plates clamping said other portion of said coil therebetween.

16. A polyphase dynamoelectric machine comprising opposed field structures mounted for rotation about an axis, said field structures being spaced apart in the direction of said axis and one of said field structures having flux producing means magnetized in the direction of said axis, and an armature comprising a coil for each phase, each of said coils being wound around one of said field structures, and one of said coils fitting within another of said coils in angularly displaced relation thereto.

References Cited by the Examiner
UNITED STATES PATENTS

| | | | |
|---|---|---|---|
| 1,947,269 | 2/1943 | Leibing | 310—163 X |
| 2,897,387 | 7/1959 | Welter | 310—268 |
| 3,018,396 | 1/1962 | Colgate | 310—268 |
| 3,091,715 | 5/1963 | Henry-Baudot | 310—268 |
| 3,215,876 | 11/1965 | Nichols et al. | 310—156 |

MILTON O. HIRSHFIELD, *Primary Examiner.*

D. F. DUGGAN, *Assistant Examiner.*